United States Patent
Kobayashi et al.

(10) Patent No.: US 9,521,248 B2
(45) Date of Patent: Dec. 13, 2016

(54) PORTABLE TERMINAL AND LOCK STATE CANCELLATION METHOD

(71) Applicant: KYOCERA Corporation, Kyoto-shi, Kyoto (JP)

(72) Inventors: Hiroki Kobayashi, Osaka (JP); Atsutaka Saiki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/417,120

(22) PCT Filed: Jul. 9, 2013

(86) PCT No.: PCT/JP2013/068696
§ 371 (c)(1),
(2) Date: Jan. 23, 2015

(87) PCT Pub. No.: WO2014/017287
PCT Pub. Date: Jan. 30, 2014

(65) Prior Publication Data
US 2015/0207922 A1    Jul. 23, 2015

(30) Foreign Application Priority Data
Jul. 24, 2012 (JP) ................................. 2012-163180

(51) Int. Cl.
*H04W 12/08* (2009.01)
*H04M 1/725* (2006.01)
(Continued)

(52) U.S. Cl.
CPC ........... *H04M 1/72577* (2013.01); *H04M 1/67* (2013.01); *H04M 1/72552* (2013.01);
(Continued)

(58) Field of Classification Search
CPC ........ H04M 1/67; H04W 12/06; H04W 12/08; H04W 24/02
(Continued)

(56) References Cited

U.S. PATENT DOCUMENTS

2010/0146437 A1*  6/2010  Woodcock ............. G06Q 30/06
                                                    715/806
2010/0257490 A1   10/2010  Lyon et al.
2010/0269040 A1   10/2010  Lee

FOREIGN PATENT DOCUMENTS

JP    11-203045 A    7/1999
JP    2012-133787 A  7/2012

OTHER PUBLICATIONS

"GOTO Lockscreen", Google, Feb. 24, 2011 [online] Internet <URL:https://play.google.com/store/apps/details?id=com.innowebtech.gOtO&hl=ja>.
(Continued)

*Primary Examiner* — Sam Bhattacharya
(74) *Attorney, Agent, or Firm* — Procopio Cory Hargreaves and Savitch LLP

(57) ABSTRACT

A mobile phone 10 comprises a display 14, a touch panel 16, etc., and can set a lock state restricting performance of predetermined processing based on a touch operation. If the display 14 is turned ON when the lock state is set, a lock screen comprising a lock object (RO), etc. is displayed. If the lock screen is displayed when there is a new arrival mail, a mail object (Oa) is further displayed in the lock screen. At this time, if the lock object is dragged and dropped onto the mail object, a mail function is performed while the lock state is canceled. At this time, the new arrival mail is displayed on the display 14.

8 Claims, 14 Drawing Sheets

(51) Int. Cl.
  *H04M 1/67* (2006.01)
  *G06F 3/0488* (2013.01)
  *G06F 3/0481* (2013.01)
(52) U.S. Cl.
  CPC ........... *H04W 12/08* (2013.01); *G06F 3/0481* (2013.01); *G06F 3/0488* (2013.01)
(58) Field of Classification Search
  USPC .......................... 455/410, 411, 412.1, 414.1
  See application file for complete search history.

(56) References Cited

OTHER PUBLICATIONS

International Search Report dated Oct. 8, 2013 issued in counterpart International Application No. PCT/JP2013/068696.
Office Action Dated Jan. 12, 2016, issued in counterpart Japanese Application No. 2012-163180.
InnoWeb Tech, LLC., Features, GOTO, Nov. 25, 2010, URL, https://web.archive.org/web/20101125031254/http://www.gotoandroidapp.com/features.html.

* cited by examiner

FIG. 1
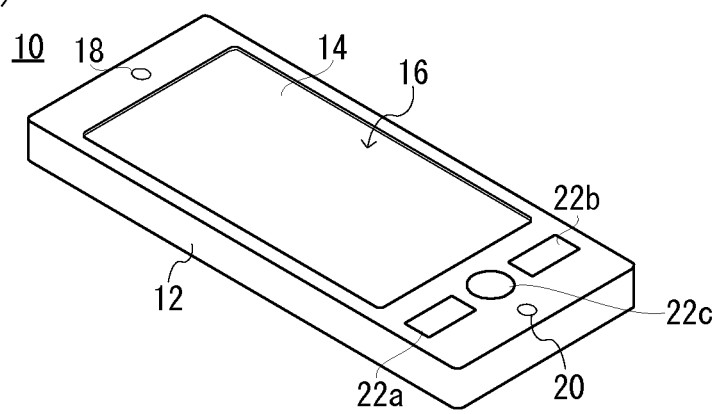
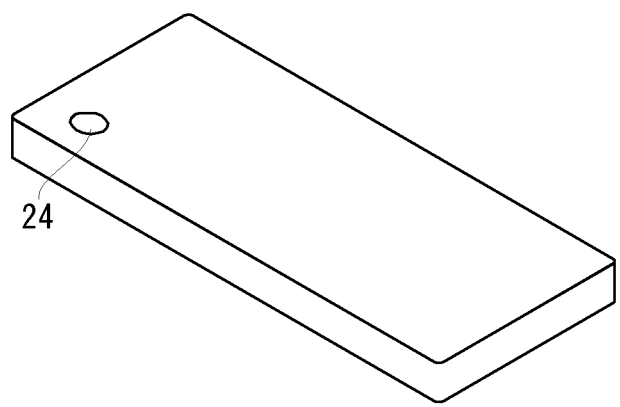

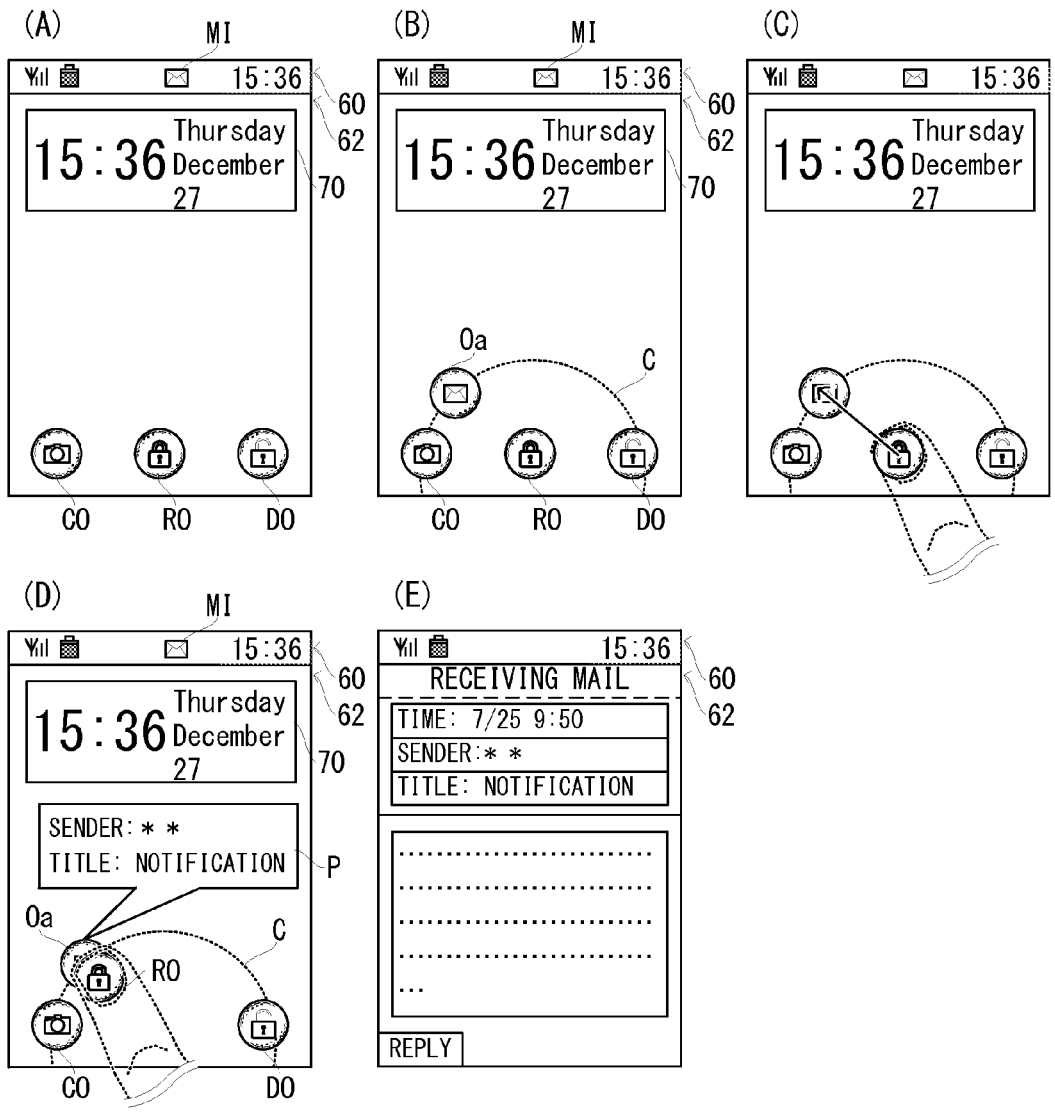

FIG. 8
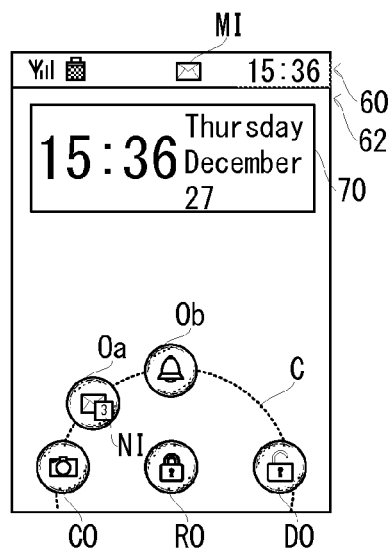
FIG. 9
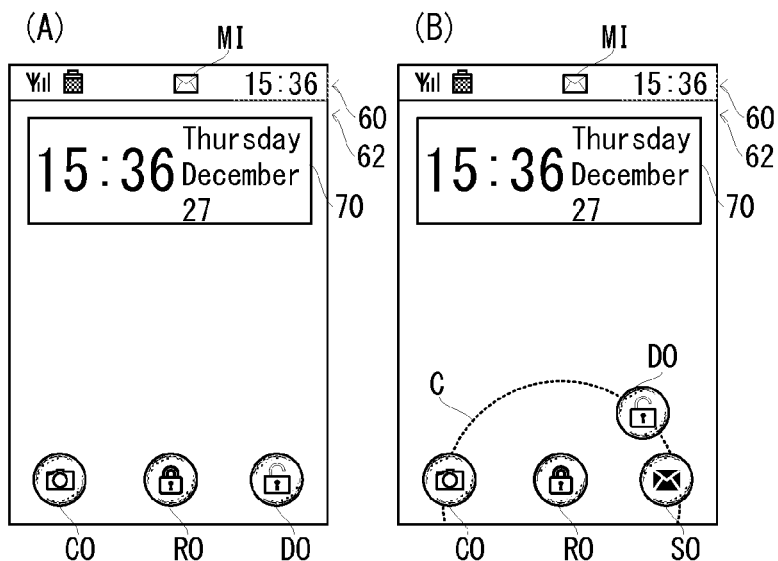
FIG. 10
SPECIFIC MAIL ADDRESS TABLE
| SPECIFIC MAIL ADDRESS |
|---|
| +++@***.com |
| ---@***.com |
| ⋮ |

FIG. 11   DISPLAY POSITION TABLE

| OBJECT | DISPLAY POSITION |
|---|---|
| LOCK OBJECT | $(X_1, Y_1)$ |
| ⋮ | ⋮ |

PORTABLE TERMINAL AND LOCK STATE CANCELLATION METHOD

FIELD OF ART

The present invention relates to a portable terminal and lock state cancellation method, and more specifically, a portable terminal capable of setting a lock state and a lock state cancellation method.

BACKGROUND ART

An example of a portable terminal capable of setting a lock state is disclosed in Patent Literature 1. In the portable terminal of Patent Literature 1, a gesture such as an operation performing a double-tap is registered for each operation scene. Then, if the gesture corresponding to an operation scene is performed to a touch panel when an operation of the touch panel is halted, the touch panel returns to a normal operation from a halt condition.

Patent Literature 1: Japanese Patent Application Laying-Open No. H11-203045 [G06F 3/033, G06F 3/00, H04Q 7/38, H04M 1/02, H04M 1/23]

SUMMARY OF THE INVENTION

Problems to be Solved by the Invention

In the portable terminal of the Patent Literature 1, a user has to memorize all of a plurality of operation scenes and gestures corresponding to them when registering the plurality of operation scenes. If the user forgets a correspondence relationship between a gesture and an operation scene when the user wishes to return the touch panel to the normal operation from the halt condition, it becomes impossible for the user to operate a portable terminal satisfactorily.

Therefore, a primary object of the present invention is to provide a novel portable terminal and lock state cancellation method.

Another object of the present invention is to provide a portable terminal and lock state cancellation method, capable of increasing convenience of a portable terminal that a lock state is being set.

Means for Solving a Problem

A first aspect of the present invention is a portable terminal having a display portion and a touch panel provided on a surface of the display portion, wherein a lock state restricting performance of predetermined processing with a touch operation can be set, and a lock object for canceling the lock state is displayed on the display portion when the lock state is being set, comprising: a storing module operable to store notice information; a display processing module operable to display a notice object corresponding to the notice information on the display portion when the lock object is displayed; a determining module operable to determine whether a predetermined touch operation that the lock object is moved onto at least a part of a display area of the notice object and then released; and a performance module operable to perform a function corresponding to the notice object while canceling the lock state when it is determined by the determining module that the predetermined touch operation is performed.

A second aspect of the present invention is a lock state cancellation method in a portable terminal having a display portion, a touch panel provided on a surface of the display portion and a storing module operable to store notice information, wherein a lock state restricting performance of predetermined processing with a touch operation can be set, and a lock object for canceling the lock state is displayed on the display portion when the lock state is being set, a processor of the portable terminal performing steps of: a display processing step displaying a notice object corresponding to the notice information on the display portion when the lock object is displayed; a determining step determining whether a predetermined touch operation that the lock object is moved onto at least a part of a display area of the notice object and then released; and an performance step performing a function corresponding to the notice object while canceling the lock state when it is determined in the determining step that the predetermined touch operation is performed.

Advantage of the Present Invention

According to the present invention, it is possible to increase convenience of a portable terminal that a lock state is being set.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows an appearance of a mobile phone of an embodiment according to the present invention, wherein FIG. 1(A) shows an appearance of a main surface side of the mobile phone and FIG. 1(B) shows an appearance of another surface side of the mobile phone.

FIG. 4(B) shows an example of a direction of a touch operation that is performed to a lock object shown in FIG. 3, and FIG. 4(C) shows an example of a standby screen.

FIG. 5 shows another example of an operation when a lock state that is being set in the mobile phone shown in FIG. 1 is to be canceled, wherein FIG. 5(A) shows another example of a direction of a touch operation that is performed to a lock object shown in FIG. 4(A), and FIG. 5(B) shows an example of a state where a camera function is performed after the lock state is canceled.

FIG. 6 shows a further example of an operation when a lock state that is being set in the mobile phone shown in FIG. 1 is to be canceled, wherein FIG. 6 (A) shows an example of a lock screen at a time that a new arrival mail is received, FIG. 6(B) shows a state where a circular arc and a mail object are further displayed in the lock screen shown in FIG. 6(A), FIG. 6(C) shows an example of a direction of a touch operation that is performed to a lock object shown in FIG. 6(A), FIG. 6(D) shows an example of a state where a detail pop-up is further displayed in the lock screen shown in FIG. 6(B), and FIG. 6(E) shows an example of a state where a mail function is performed after the lock state is canceled.

FIG. 7 is a schematic view showing an example of a format of a notice information table stored in a RAM shown in FIG. 2.

FIG. 8 shows an example of a state where a circular arc, a mail object, an alarm object and a number icon are further displayed in the lock screen shown in FIG. 6(A).

FIG. 9 shows an example of screen transition until a specific notice icon is displayed in the lock screen shown in FIG. 6(A), wherein FIG. 9(A) shows an example of a lock screen at a time that a new arrival mail is received, and FIG. 9(B) shows an example of a state where a circular arc and a specific notice icon are further displayed in the lock screen as shown in FIG. 6(A).

FIG. 10 is a schematic view showing an example of a format of a specific mail address table stored in a RAM shown in FIG. 2.

FIG. 11 is a schematic view showing an example of a format of a display position table stored in a RAM shown in FIG. 2.

FIG. 12 shows an example of an operation procedure when a display position of an object that is displayed in the lock screen shown in FIG. 6(B) is to be changed, wherein FIG. 12(A) shows an example of a state where a circular arc and a mail object are further displayed in the lock screen as shown in FIG. 6(A), FIG. 12(B) shows an example of a touch operation that is performed to the mail object, and FIG. 12(C) shows an example of display after the display position of the mail object is changed.

FIG. 13 shows another example of an operation procedure when a display position of an object that is displayed in the lock screen shown in FIG. 6(B) is to be changed, wherein FIG. 13(A) shows an example of a touch operation that is performed to a mail object, and FIG. 13(B) shows another example of display after the display position of the mail object is changed.

FIG. 21(B) shows a further example of a direction of a touch operation that is performed to a lock object shown in FIG. 3, FIG. 21(C) shows an example of a state during the touch operation is being performed in the direction shown in FIG. 21(B), FIG. 21(D) shows an example of a state where the touch operation is performed in the direction shown in FIG. 21(B), FIG. 21(E) shows a state where the touch operation is ended, and FIG. 21(F) shows an example of a standby screen.

FIG. 21(B) shows the other example of a direction of a touch operation that is performed to a lock object shown in FIG. 3, FIG. 22(C) shows an example of a state during the touch operation is being performed in the direction shown in FIG. 22(B), FIG. 22(D) shows an example of a state where the touch operation is performed in the direction shown in FIG. 22(B), and FIG. 22(E) shows an example of a standby screen.

FORMS FOR EMBODYING THE INVENTION

Figure 2:
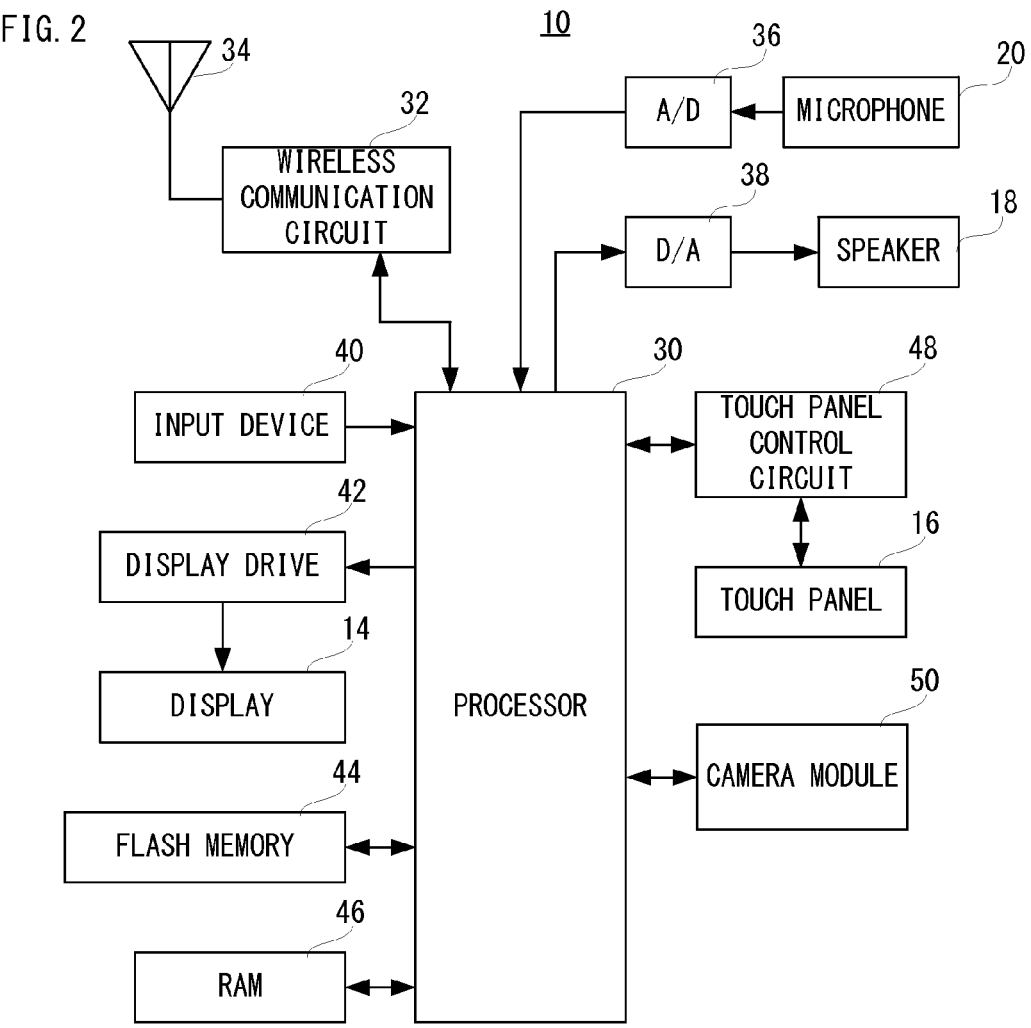
FIG. 2 is a schematic view showing electrical structure of the mobile phone shown in FIG. 1.

With referring to FIG. 1, a mobile phone 10 of an embodiment according to the present invention is a smartphone as an example, and includes a longitudinal flat rectangular housing 12. However, it is pointed out in advance that the present invention can be applied to an arbitrary mobile terminal such as a tablet terminal, a PDA, etc.

A display 14 such as a liquid crystal, organic EL, etc. is provided on a main surface (front surface) of the housing 12, which functions as a display portion. A touch panel 16 is provided on the display 14. Therefore, in the mobile phone 10 of this embodiment, the most part of input operations excepting an input by an operation of hardware keys described later is performed through the touch panel 16.

A speaker 18 is housed in the housing 12 at one end of a longitudinal direction on a side of the front surface, and a microphone 20 is housed at the other end in the longitudinal direction on the side of the front surface.

As hardware keys that constitute an input operating module together with the touch panel 16, a call key 22*a*, an end key 22*b* and a menu key 22*c* are provided, in this embodiment.

Furthermore, a lens aperture 24 that communicates with a camera module 50 (see FIG. 2) is provided at one end of the longitudinal direction on another surface (rear surface) of the housing 12.

The user can input a telephone number by performing a touch operation by the touch panel 16 to a dial key (not shown) displayed on the display 14, for example, and start a telephone conversation by operating the call key 22*a*. If the end key 22*b* is operated, the telephone conversation can be ended. In addition, by long-depressing the end key 22*b*, it is possible to turn ON/OFF a power supply of the mobile phone 10.

If the menu key 22*c* is operated, a menu screen is displayed on the display 14, and in such a state, by performing a touch operation by the touch panel 16 to a software key, a menu icon or the like (both not shown) being displayed on the display 14, it is possible to select a menu and to determine such a selection.

Furthermore, although details will be described later, if a camera function is performed, the camera module 50 is enabled and a preview image (through image) corresponding to a photographic subject is displayed on the display 14. Then, the user can image the photographic subject by turning the other surface that the lens aperture 24 is provided to the photographic subject and performing an imaging operation.

With referring to FIG. 2, the mobile phone 10 of the embodiment shown in FIG. 1 includes a processor 30 that is called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, the camera module 50, etc.

The processor 30 is in charge of entire control of the mobile phone 10. A whole or a part of a program that is set in advance in the flash memory 44 is, in use, developed or loaded into the RAM 46 that functions as a storing module, and the processor 30 operates in accordance with the program developed in the RAM 46. In addition, the RAM 46 is further used as a working area or buffer area for the processor 30.

The input device 40 includes the touch panel 16 and the hardware keys 22*a*, 22*b* and 22*c* shown in FIG. 1, and thus constitutes an operation receiving module that receives a touch operation to the touch panel 16 by the user and a key operation to the hardware keys 22 by the user. Information (key data) of the hardware key that the user operates is input to the processor 30.

The wireless communication circuit 32 is a circuit for sending and receiving a radio wave for a telephone conversation, a mail, etc. via an antenna 34. In this embodiment, the wireless communication circuit 32 is a circuit for performing a wireless communication with a CDMA system. For example, if the user designates an outgoing call (telephone call) using the input device 40, the wireless communication circuit 32 performs telephone call processing under instructions from the processor 30 and outputs a telephone call signal via the antenna 34. The telephone call signal is sent to a telephone at the other end of line through a base station and a communication network. Then, when incoming call processing is performed in the telephone at the other end of line, a communication-capable state is established and the processor 30 performs telephonic communication processing.

The microphone 20 shown in FIG. 1 is connected to the A/D converter 36, and as described above, a voice signal from the microphone 20 is input to the processor 30 as digital voice data through the A/D converter 36. The speaker 18 is connected to the D/A converter 38. The D/A converter 38 converts digital voice data into a voice signal to apply to the speaker 18 via an amplifier. Therefore, a voice of the voice data is output from the speaker 18.

The display driver 42 is connected to the display 14, and therefore, the display 14 displays an image or video in accordance with image or video data that is output from the processor 30. That is, the display driver 42 controls display by the display 14 that is connected to the display driver 40 under instructions by the processor 30. In addition, the display driver 42 includes a video memory that temporarily stores the image or video data to be displayed. The display 14 is provided with a backlight that includes a light source of an LED or the like, for example, and the display driver 42 controls, according to the instructions from the processor 30, brightness, turning ON/OFF of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch to the touch panel 16 by the user, a touch end signal indicating an end of a touch by the user, and coordinate data indicating a touch position that the user touches. Therefore, the processor 30 can determine which icon or key is touched by the user based on the coordinate data.

In the embodiment, the touch panel 16 is of an electrostatic capacitance system that detects change of an electrostatic capacitance between electrodes, which occurs when an object such as a finger is in close to a surface of the touch panel 16, and it is detected that one or more fingers are brought into contact with the touch panel 16, for example. Therefore, the touch panel 16 is called a pointing device. The touch panel control circuit 48 functions as a detecting module, and detects a touch operation within a touch-effective range of the touch panel 16, and outputs coordinate data indicative of a position of the touch operation to the processor 30. That is, the user inputs an operation position, an operation direction, etc. through a touch operation on the surface of the touch panel 16 to the mobile phone 10.

A tap operation, a long tap operation, a flick operation, a slide operation, etc. are included in the touch operation of this embodiment.

The tap operation is an operation that a finger is brought into contact with the surface of the touch panel 16, and then, the finger is lifted (released) from the surface of the touch panel 16 within a short time. The long tap operation is an operation that a finger is continued to be brought into contact with a surface of the touch panel 16 for a predetermined time period, and then, the finger is released from the surface of the touch panel 16. The flick operation is an operation that a finger is brought into contact with the surface of the touch panel 16, and flips the finger in an arbitrary direction with a predetermined speed or more. The slide operation is an operation that a finger is moved in an arbitrary direction while being kept to be brought into contact with the surface of the touch panel 16, and then, the finger is released from the surface of the touch panel 16.

It should be noted that in the above-described slide operation, a slide operation that a finger is brought into contact with an object that is being displayed on the surface of the display 14 and makes the object move, that is, a so-called drag operation is also included.

In addition, in the following description, an operation that a finger is released from a surface of the touch panel 16 after the drag operation is called a drop operation. Furthermore, there is an occasion that the touch operation, the long tap operation, the flick operation, the slide operation, the drag operation and the drop operation may be described while omitting the word "operation", respectively.

Furthermore, an object of this embodiment includes an icon for performing a function, a shortcut icon, a file, a folder, etc.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a stylus or the like.

The camera module 50 includes a control circuit, a lens, an image sensor, etc. The processor 30 enables the control circuit and the image sensor if an operation for performing a camera function is performed. Then, if image data based on a signal that is output from the image sensor is input to the processor 30, a preview image according to a photographic subject is displayed on the display 14.

The mobile phone 10 of this embodiment can perform a mail function, an alarm function, etc. other than a telephone function.

Figure 3:
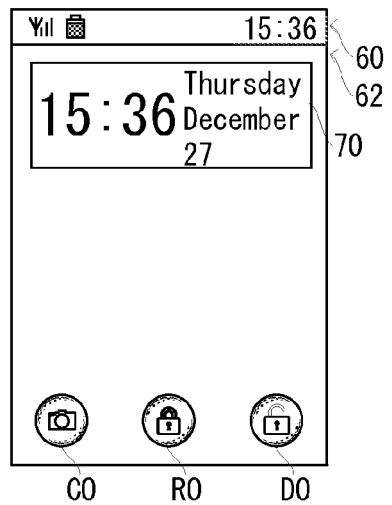
FIG. 3 is a schematic view showing an example of a lock screen that is displayed on a display shown in FIG. 1.

Furthermore, in the mobile phone 10 of this embodiment, in order to prevent an erroneous operation by the user's unintentional input to the touch panel 16, it is possible to set a lock state restricting performance of the predetermined processing based on touch operation. If the end key 22*b* is operated, for example, a lock state is set while the power supply of the display 14 and the touch panel 16 is turned OFF. If the menu key 22c, etc. are operated in this state, the power supply of the display 14 and the touch panel 16 is turned ON, and a lock screen shown in FIG. 3 is displayed, and a cancellation operation of the lock state becomes to be received. However, if the display of the display 14 is not changed for a predetermined time period, the display 14 is automatically turned OFF, and thus, a lock state is also set.

In addition, since the power supply of the display 14 and the touch panel 16 is turned OFF until a lock screen is displayed in the lock state in this embodiment, the power consumption of the mobile phone 10 can be suppressed. However, in other embodiments, the processor may not process a touch operation that is input, thereby to make the touch operation invalid without turning OFF the power supply of the touch panel 16.

With reference to FIG. 3, a display range of the display 14 that displays a lock screen includes a status display area 60 and a function display area 62. In the status display area 60, an icon (picto) showing a radio-wave receiving status by the antenna 34, an icon showing a residual battery capacity of a secondary battery and a day and time are displayed. Furthermore, in the function display area 62, a current day and time 70 is displayed, and in a lower part, a lock object RO, a cancellation object DO and a camera object CO are displayed.

Figure 4:
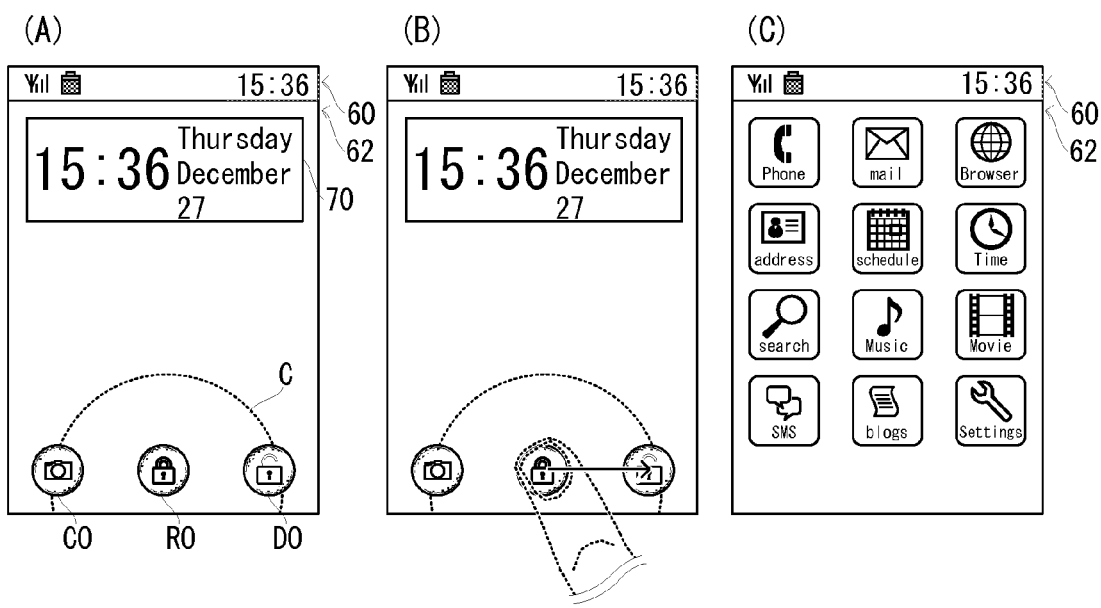
FIG. 4 shows an example of an operation when a lock is being set in the mobile phone shown in FIG. 1 is to be canceled, wherein FIG. 4 (A) shows an example of a state where a circular arc is further displayed in the lock screen shown in FIG. 3.

With reference to FIG. 4 (A), if touched to the lock object RO, a circular arc C is displayed such that the cancellation object DO and the camera object CO are arranged on an orbit. Furthermore, if a drag is performed to the lock object RO, a display position thereof is changed according to a position of a finger of the user, i.e., a current touch position.

With reference to FIG. 4 (B), if a drag is performed to the lock object RO and the lock object RO is dropped in a state where the lock object RO is overlapped with the cancellation object DO, the lock state is canceled. If the lock state is canceled, as shown in FIG. 4 (C), instead of the lock screen, a standby screen becomes to be displayed. That is, a user can cancel the lock state by dragging and dropping the lock object RO onto the cancellation object DO. Thus, according to this embodiment, since the lock object RO and the cancellation object DO are displayed in the lower part of the display 14 as shown in FIG. 4 (C), the user can perform a cancellation operation of the lock state with either a right hand or a left hand. Furthermore, the user can also perform a cancellation operation of the lock state easily with a single hand.

In addition, when dropping the lock object RO onto the cancellation object DO, the lock object RO may be in the state of overlapping with a part of the cancellation object DO or in a state of overlapping with a whole. That is, the lock state can be canceled even if dropped in either state.

Figure 5:
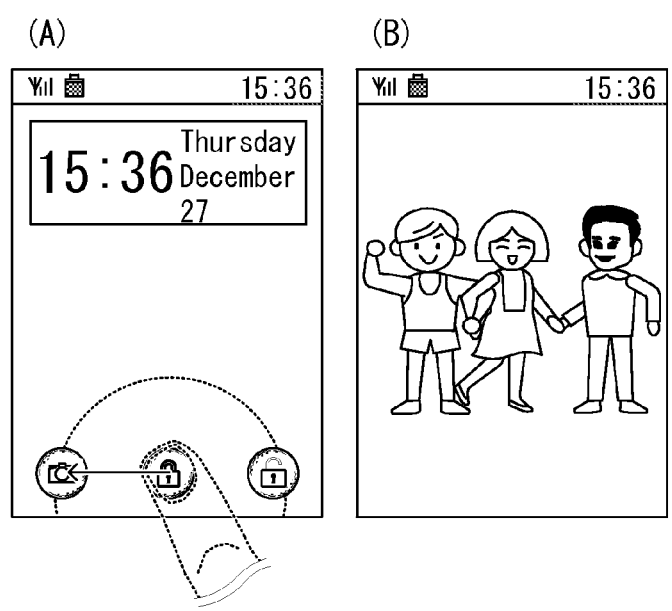

With reference to FIG. 5 (A), if the lock object RO is dragged and dropped onto the camera object CO that is displayed on the display 14, a camera function can be performed while the lock state is canceled. If the camera function is performed, as shown in FIG. 5 (B), instead of the lock screen, a through image that is obtained by the camera function becomes to be displayed on the display 14. That is, the user can perform the camera function while canceling the lock state.

With reference to FIG. 6 (A), when the lock screen is displayed, if there is an unread receiving mail (also called a new arrival mail), a mail icon MI is displayed in the status display area. If touched to the lock object RO in this state, as shown in FIG. 6 (B), in addition to the cancellation object DO and the camera object CO, a mail object Oa is displayed on the circular arc C.

With reference to FIGS. 6 (C) and (D), if the lock object RO is dragged and a part of the lock object RO is overlapped with a part of the mail object Oa, a detail pop-up P is displayed. This detail pop-up P includes a sender ("**") and a title ("notification") of a mail as information concerning the new arrival mail. That is, the user can check a part of content of an unread receiving mail without canceling the lock state. Therefore, the user can determine whether a function corresponding to a notice object is to be performed. When a detail pop-up P is checked and it is determined that it is not important mail, for example, the user should just terminate a drag operation without canceling the lock state. In addition, in other embodiments, a text of an unread receiving mail may be displayed in a detail pop-up P.

With reference to FIG. 6 (E), if the lock object RO is dropped onto the mail object Oa, a mail function is performed while the lock state is canceled. Furthermore, when the mail function is performed, an unread new arrival mail is displayed in the function display area 62. That is, with few operating procedures, a user can check an unread receiving mail while canceling the lock state.

In addition, in other embodiments, a receiving mail list including an unread receiving mail may be displayed in the function display area 62. In this case, the user can check another receiving mail together with an unread receiving mail.

Here, the mail object Oa is displayed when the notice information of a mail is recorded in a notice information table.

FIG. 7 is a schematic view showing an example of a format of the notice information table. When an event such as reception of a new arrival mail occurs, notice information is recorded in the notice information table. With reference to FIG. 7, a column of a function, a column of display information and a column of the number of cases are included in the notice information table, and if an event occurs, a new line is added, and notice information of the event that occurs is recorded in the added line.

If a new arrival mail is received, for example, "mail" is recorded in the column of a function and "sender: **" and "title: notification" are recorded in the column of display information. Furthermore, if it is in a state where two new arrival mails are received in the lock state, "3" is recorded in the column of the number of cases. That is, in the column of the number of cases, the number of times that the event of the same kind occurs is recorded. However, when the event of the same kind is not recorded, "1" is recorded in the column of the number of cases.

In addition, when two or more events of the same kind occur, the content currently recorded in the column of display information is renewed by the content of the event that occurs at the last time. That is, in the notice information on the new arrival mail shown in FIG. 7, the content currently recorded in the column of display information corresponds to the new arrival mail that is received lastly.

Furthermore, if reaching at an alarm time is notified by the alarm function, "alarm" is recorded in the column of a function, and "time: 14:30" and "content: interview" are recorded in the column of display information. Furthermore, since record of the notice information of the alarm is the first time here, "1" is recorded in the column of the number of cases.

Furthermore, although illustration is omitted, notice information is also recorded at a time that absent incoming occurs or that a voice is recorded by an answering machine function. Hereinafter, the object that is displayed based on the notice information may be called a "notice object O" collectively.

In addition, if a lock state is canceled using the notice object O, the notice information corresponding to the notice object is deleted from the notice information table.

With reference to FIG. 8, if the lock object RO is touched when the notice information is recorded as shown in FIG. 7, the mail object Oa and the alarm object Ob that are included in the notice object O are displayed on the circular arc C.

Here, since the number of cases is recorded as "3 (two or more)" in the notice information for the new arrival mail shown in FIG. 7, a number icon NI is applied to the mail object Oa. The number icon NI shows the number of the events that occur according to a function corresponding to the notice object O (here, mail object Oa). Therefore, a character string of "3" indicating that three new arrival mails are received is included in the number icon NI of FIG. 8. Accordingly, the user can grasp more correctly the notice information currently recorded.

Then, if the lock object RO is dropped onto each of these notice objects O, the function corresponding to the notice object O is performed while the lock state is canceled.

If the lock object RO is dropped onto the mail object Oa to which the number icon NI is applied, for example, the new arrival mail that is received at the last time is displayed on the function display area 62. Furthermore, if the lock object RO is dropped onto the alarm object Ob, the alarm time and the content that is notified are displayed on the function display area 62. In this case, the user can grasp the content of the alarm that is notified.

Thus, in this embodiment, since a display manner of the notice object O is changed according to the function corresponding to the notice information, the user can grasp the notice information intuitively.

In addition, by displaying the notice object O apart from the lock object RO with a predetermined distance, the lock state is not canceled by an erroneous operation.

With reference to FIGS. 9 (A) and 9(B), when a mail is received from a specific person (sender), instead of the notice object O, a specific notice object SO is displayed. Furthermore, the specific notice object SO is displayed at a position that is easy to drop.

Here, FIG. 9 (A) shows an example of a position that is easy to drop the lock object RO onto the cancellation object DO. Describing specifically, in this embodiment, when the user holds the mobile phone 10 by a single hand, a lower part that the touch panel 16 can be operated by the holding hand and a finger of a hand opposite to the holding hand is defined as the position that is easy to drop.

Then, the specific object SO is displayed at a position that the cancellation object DO is displayed. Furthermore, the cancellation object DO is displayed at an upper part from its original display position on the circular arc C.

Thus, even if the lock state is not canceled, the user can notice that there is a new arrival mail from a specific sender. That is, in this embodiment, since the specific notice object SO that a display manner differs from those of the usual notice object O is displayed when important notice information is recorded, the user can know that important notice information is stored. Furthermore, in this embodiment, when the new arrival mail from a specific sender is received, the display position of the object is changed so that the user can check the content more easily.

With reference to FIG. 10, a mail address of a specific sender is registered in a specific mail address table. For example, although the specific mail address is registered in advance by the carrier, the user can arbitrarily add a specific mail address.

With reference to FIG. 11, a default display position (display coordinate) of an object that is to be displayed in a lock screen is recorded in a display position table. A column of an object and a column of a display position are included in the display position table, and for each line, a display position is recorded while being related with a name of the object.

For example, as a display position for the lock object RO, (X1, Y1) is recorded while being related with each other. In addition, although illustration is omitted, display positions of the cancellation object DO, the camera object CO and the mail object Oa, etc. are also recorded in the display position table.

Here, if an arbitrary notice object O is dragged and dropped onto an arbitrary position of the circular arc C when the notice object O is being displayed, the default display position of the notice object O that is dragged is changed. That is, the user can change the position that the notice object O is displayed to a position that is easy to operate by himself/herself.

With reference to FIGS. 12(A)-12(C), for example, if the mail object Oa that is currently displayed on a left part of the circular arc C is dragged and dropped onto a right part of the circular arc C, the default display position of the mail object Oa is changed to the right part from the left part of the circular arc C. If thus changed, the display position recorded in the above-described display position table is changed.

Furthermore, when the notice object O is dropped onto the position that another object is being displayed, after changing the display position of the other object to a further display position, the default display position of the notice object O is changed to a display position that the other object was displayed.

Figure 13:
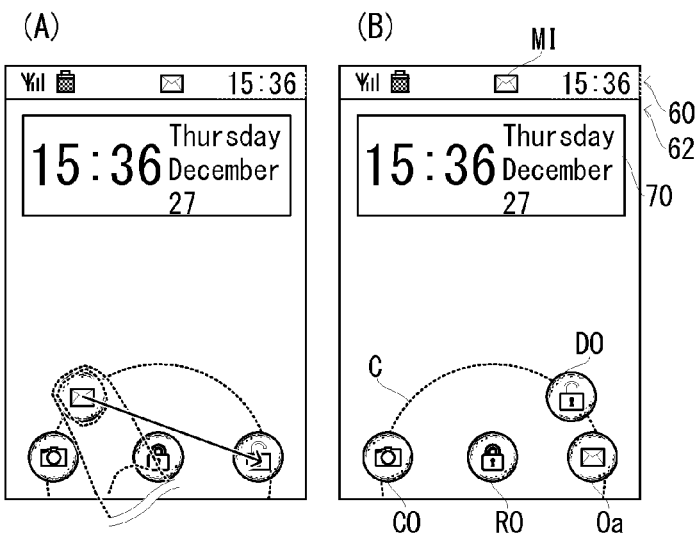

With reference to FIGS. 13 (A) and 13(B), for example, if the mail object Oa is dragged and dropped onto the cancellation object DO, the display position of the cancellation object DO is changed to an upper part. Then, the display position of the mail object Oa is changed to a position that the cancellation object DO was originally displayed.

As seen from the above description, according to this embodiment, it is possible to make a function that is more likely to be performed by the user easy to perform with cancellation of the lock state by displaying the notice object O. Accordingly, the convenience of the mobile phone 10 that the lock state is being set improves.

In the above, the feature of the embodiment is outlined. In the following, the embodiment will be described in detail using a memory map shown in FIG. 14 and flowcharts shown in FIG. 15-FIG. 20.

Figure 14:
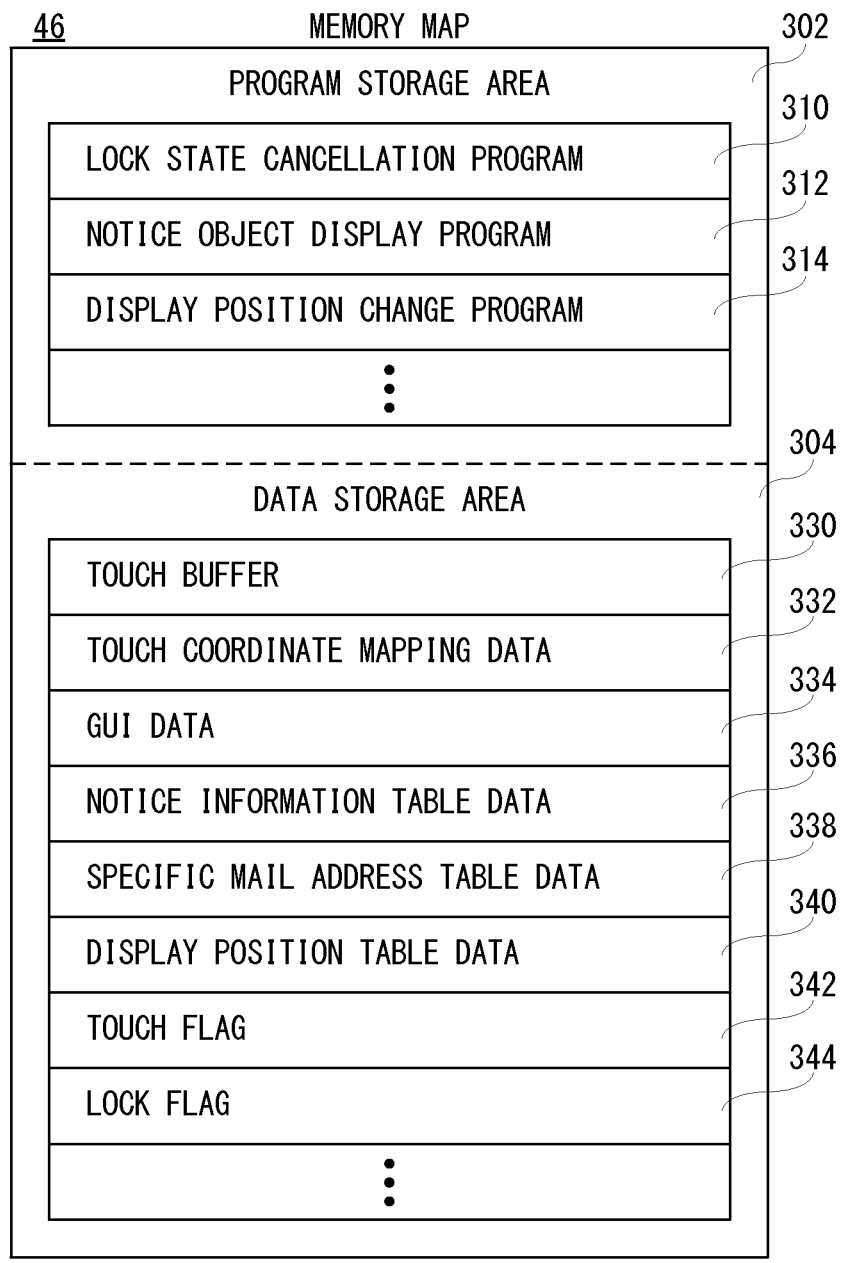
FIG. 14 is a schematic view showing an example of a memory map of a RAM shown in FIG. 2.
Figure 15:
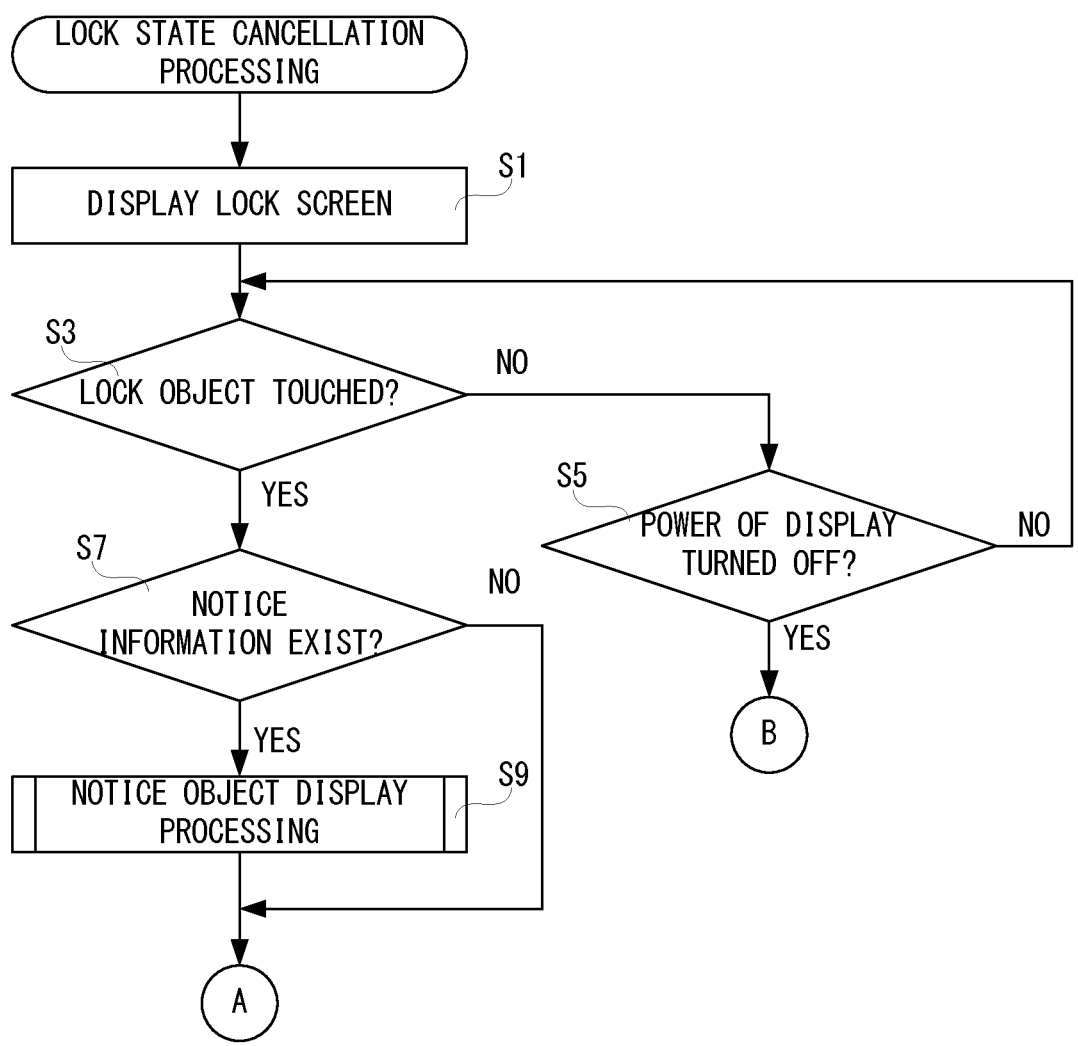
FIG. 15 is a flowchart showing an example of a part of lock state cancellation processing by a processor shown in FIG. 2.

With referring FIG. 14, the RAM 46 shown in FIG. 2 is formed with a program storage area 302 and a data storage area 304. As previously described, the program storage area 302 is an area for reading and storing a part or a whole of program data that is set in advance in the flash memory 44 (FIG. 2).

The program storage area 302 is stored with a lock state cancellation program 310, a notice object display program 312, a display position change program 314, etc. The lock state cancellation program 310 is a program for canceling a lock state or performing a function with cancellation of a lock state. The notice object display program 312 is a program performed when displaying the notice object O.

The display position change program 314 is a program executed when arbitrarily changing (editing) a display position of the notice object O.

In addition, the program storage area 302 further includes programs for performing a telephone function, a telephone answering machine function, a mail function, etc.

The data storage area 304 of the RAM 46 is provided with a touch buffer 330, and stored with touch coordinate mapping data 332, GUI data 334, notice information table data 336, specific mail address table data 338, display position table data 340, etc. The data storage area 304 is further provided with a touch flag 342 and a lock flag 344.

The touch buffer 330 is stored with touch coordinate data that is output from the touch panel control circuit 48. The touch coordinate mapping data 334 is data for mapping the touch coordinate of the touch operation and the display coordinate of the display 14 with each other. That is, a result of the touch operation performed to the touch panel 16 is reflected in the display of the display 14 based on the touch coordinate mapping data 332.

The GUI data 334 is data for displaying a GUI such as the lock object RO, the cancellation object DO, the camera object CO, the notice object O, the mail icon MI, the number icon NI, etc. The notice information table data 336 is data that the notice information is recorded as shown in FIG. 7. The specific mail address table data 338 is data that the specific mail address registered by the user, etc. is recorded as shown in FIG. 10. The display position table data 340 is data that the display position of each object displayed in the lock screen as shown in FIG. 11 is recorded.

The touch flag 342 is a flag for determining whether a touch to the touch panel 16 is performed. The touch flag 342 is constructed by a 1-bit register, for example. If the touch flag 342 is turned-ON (true), a data value "1" is set in the register, and if the touch flag 342 is turned-OFF (false), a data value "0" is set in the register. In addition, the touch flag 340 is switched ON/OFF based on a signal that the touch panel control circuit 48 outputs.

Furthermore, the lock flag 344 is a flag indicating whether the lock state is set. For example, the lock flag 344 is rendered ON according to processing that turns OFF the power supply of the display 14 and the touch panel 16. Furthermore, the lock flag 344 is rendered OFF according to processing of the above-described lock state cancellation program 310. Then, since structure of the lock flag 344 is approximately the same as those of the touch flag 342, a detailed description about the structure is omitted.

The data storage area 304 is stored with the image data that is displayed in the standby state, data of character strings, and provided with counters and flags necessary for operation of the mobile phone 10.

Figure 18:
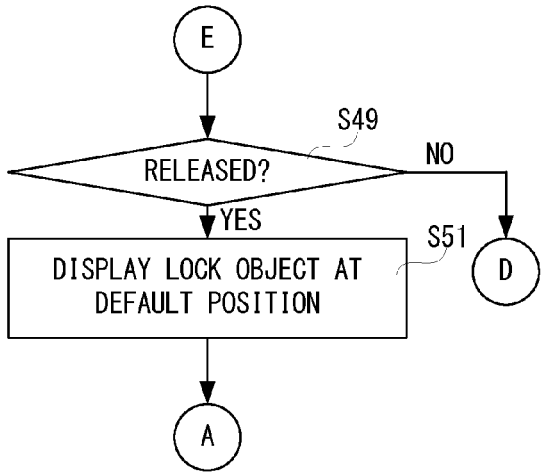
FIG. 18 is a flowchart showing an example of the other part of the lock state cancellation processing by the processor shown in FIG. 2 while following FIG. 17.
Figure 19:
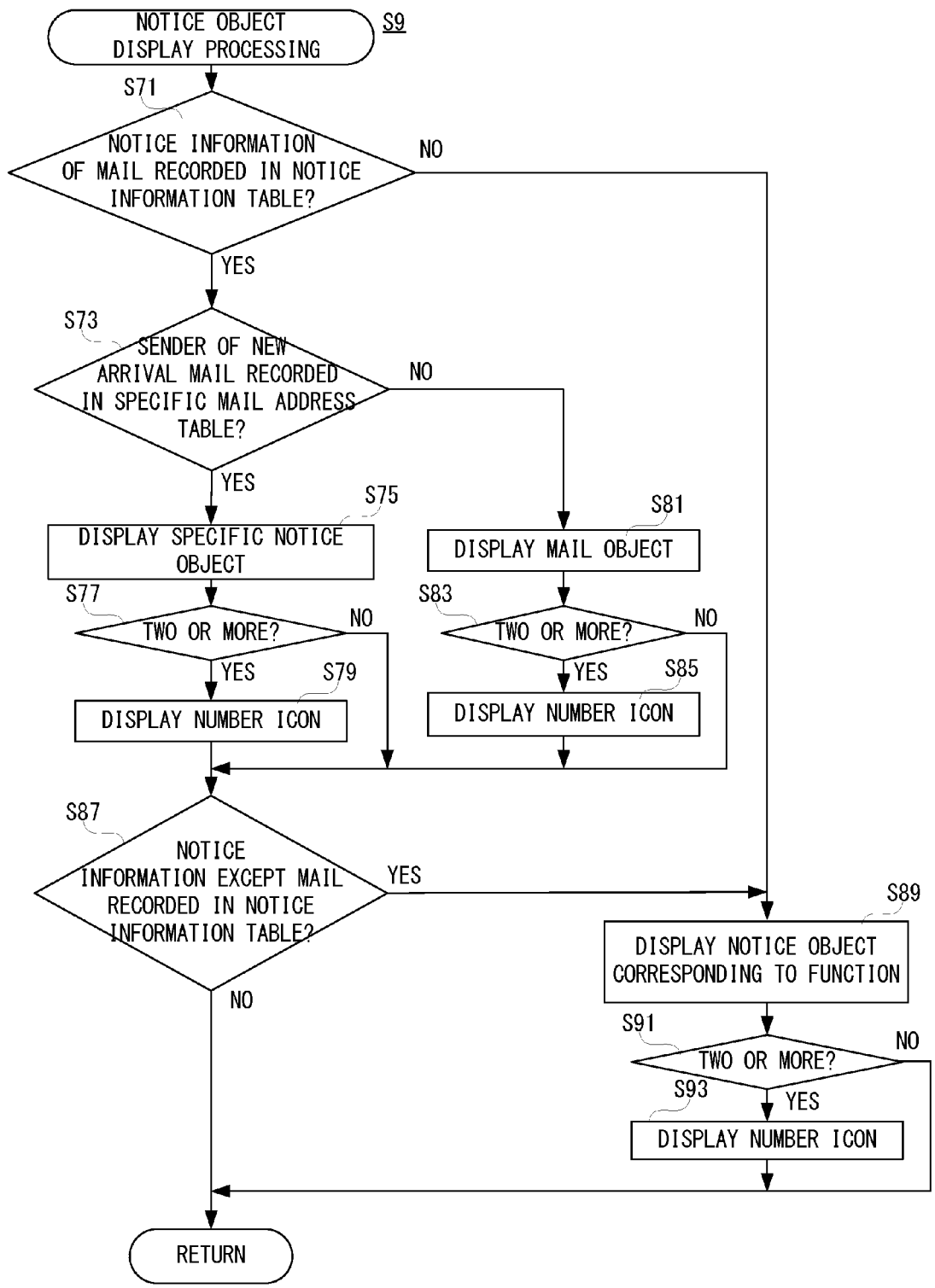
FIG. 19 is a flowchart showing an example of notice object display processing by the processor shown in FIG. 2.
Figure 20:
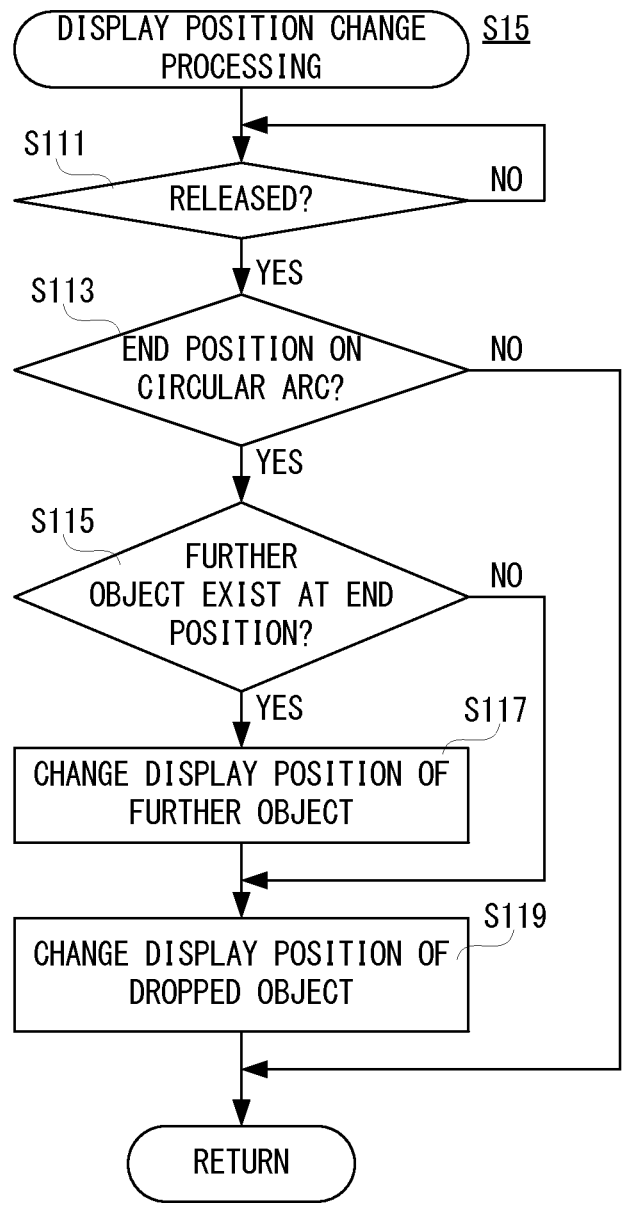
FIG. 20 is a flowchart showing an example of display position change processing by the processor shown in FIG. 2.

The processor 30 processes a plurality of tasks including lock state cancellation processing shown in FIG. 15-FIG. 18, notice object display processing shown in FIG. 19, display position change processing shown in FIG. 20, etc. in parallel with each other under controls of Linux (registered trademark)—base OS such as Android (registered trademark) and REX, or other OSs.

The lock state cancellation processing is started when the power supply of the display 14 is turned ON in a state where the lock state is set (the lock flag 344 is turned ON).

In a step S1, the processor 30 acquires the day and time information from the RTC, and reads the image data of the lock object RO included in the GUI data 334 and displays the lock screen as shown in FIG. 3 in the function display area 62 of the display 14.

Subsequently, the processor 30 determines in a step S3 whether a touch operation is performed to the lock object RO. Specifically, the processor 30 determines whether the coordinate that indicates the current touch position stored in the touch buffer 330 is included within a predetermined range of the display position (display coordinate) of the lock object RO in the display position table data 340.

If "NO" is determined in the step S3, that is, if a touch operation is not performed to the lock object RO, the processor 30 determines whether the power supply of the display 14 is OFF in a step S5. The power supply of the display 14 is turned OFF if the end key 22b is operated or the display of the display 14 does not change for a predetermined time period, for example. Therefore, the processor 30 determines whether the power supply of the display 14 is turned OFF by these factors, in the step S5. If "YES" is determined in the step S5, that is, if the power supply of the display 14 is turned OFF, the processor 30 terminates the lock state cancellation processing.

On the other hand, if "NO" is determined in the step S5, that is, if the display 14 is not turned OFF, the processor 30 returns to the processing of the step S3. If "YES" is determined in the step S3, that is, if the lock object RO is touched, for example, the processor 30 determines in a step S7 whether there is any notice information. That is, it is determined whether notice information is recorded in the notice information table data 336. If "YES" is determined in the step S7, that is, if notice information is recorded, the processor 30 performs notice object display processing in a step S9, and then, proceeds to processing of a step S11 of FIG. 16. In addition, since the notice object display processing will be described later, a detailed description thereof is omitted here. Furthermore, the processor 30 that performs the processing of the step S9 functions as a display processing module.

Furthermore, if "NO" is determined in the step S7, that is, if notice information is not recorded, the processor 30 proceeds to processing of a step S11.

Figure 16:
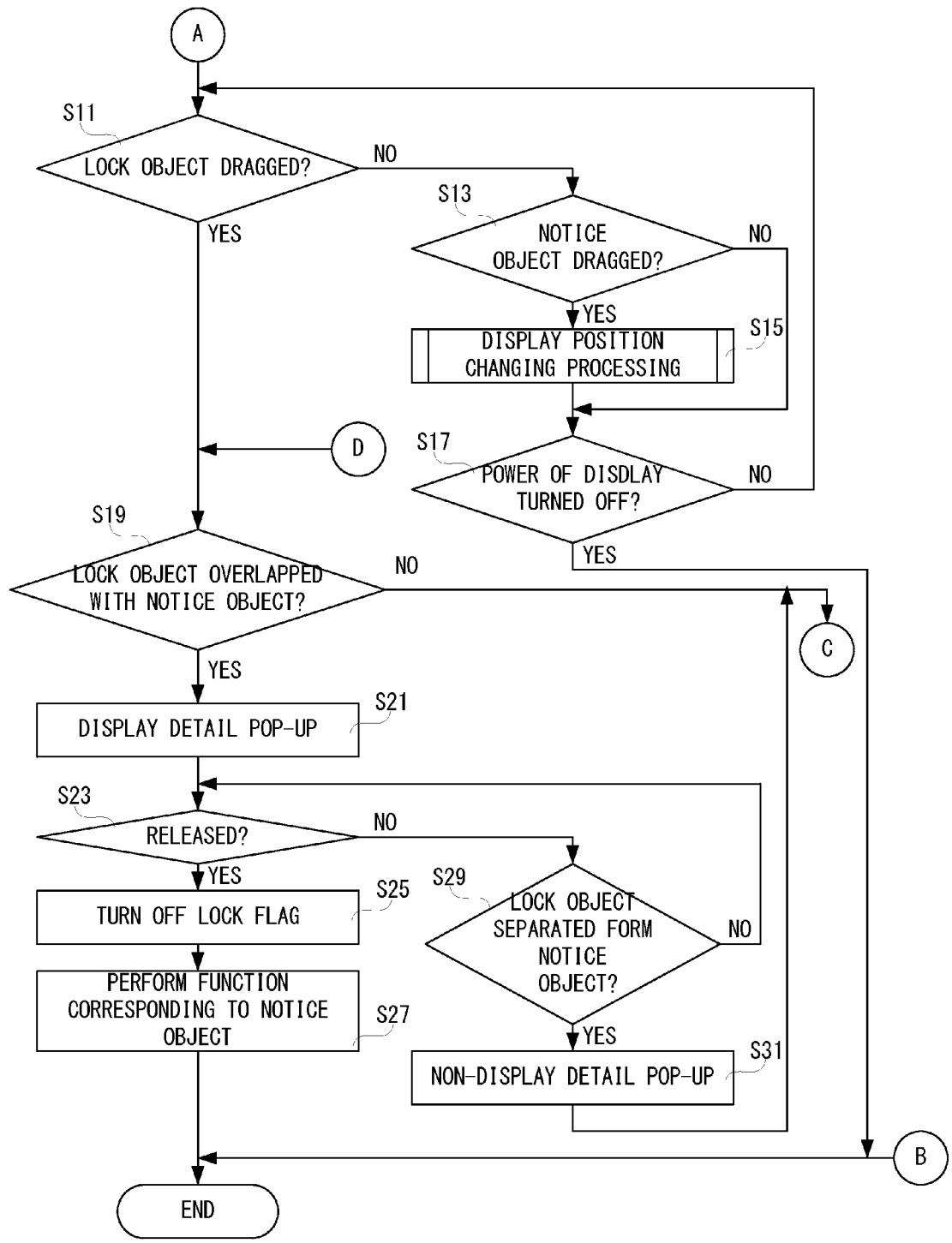
FIG. 16 is a flowchart showing an example of another part of the lock state cancellation processing by the processor shown in FIG. 2 while following FIG. 15.
Figure 17:
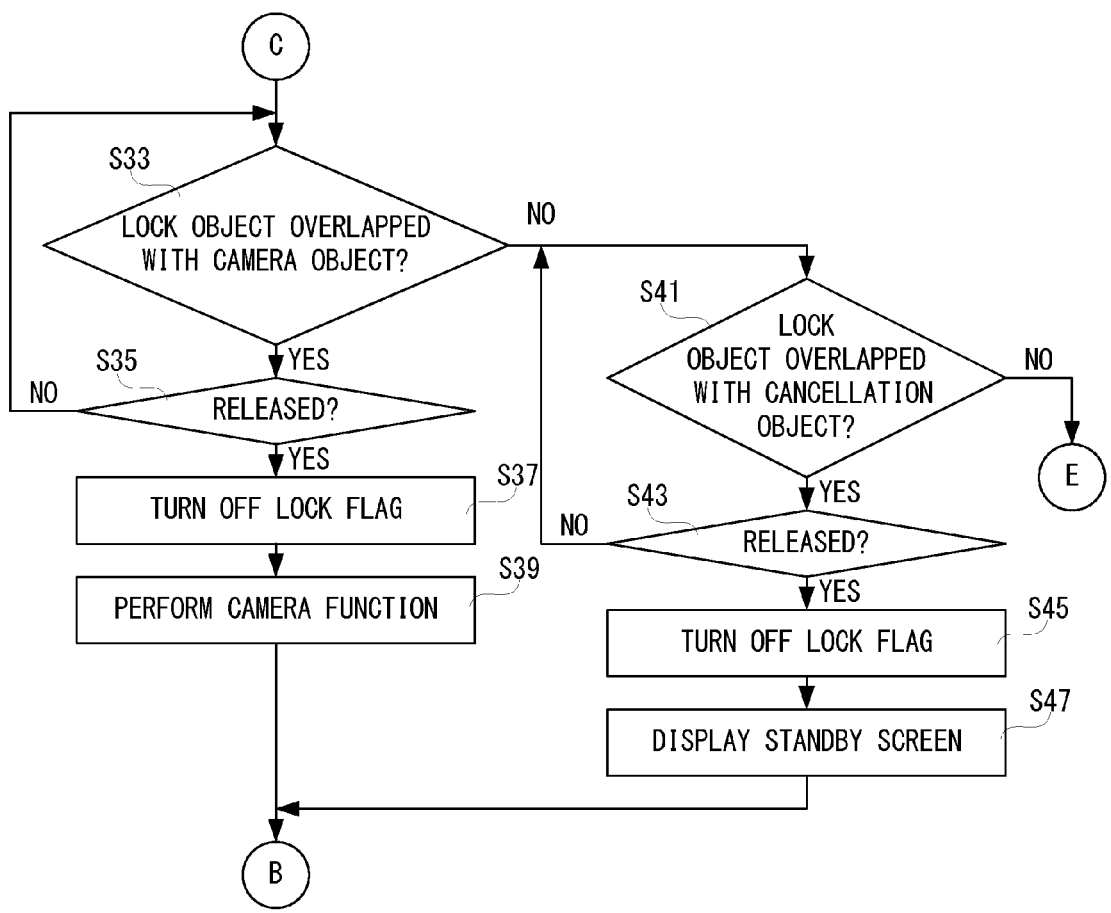
FIG. 17 is a flowchart showing an example of a further part of the lock state cancellation processing by the processor shown in FIG. 2 while following FIG. 16.

Subsequently, the processor 30 determines in the step S11 of FIG. 16 whether the lock object RO is dragged. That is, it is determined whether after touching the lock object RO, an operation that slides the touch is performed. If "NO" is determined in the step S11, that is, if a drag operation is not performed to the lock object RO, the processor 30 determines in a step S13 whether the notice object O is dragged. That is, it is determined whether after touching the notice object O, an operation that slides the touch is performed.

If "NO" is determined in the step S13, that is, if the notice object O is not dragged, the processor 30 proceeds to processing of a step S17. On the other hand, if "YES" is determined in the step S13, that is, if the notice object O is dragged, the processor 30 performs display position change processing in a step S15. In addition, since the display position change processing will be described later, a detailed description thereof is omitted here.

Subsequently, the processor 30 determines in a step S17 whether the power supply of the display 14 is OFF like the step S5. If "YES" is determined in the step S17, that is, if the power supply of the display 14 is turned OFF, the processor 30 terminates the lock state cancellation processing. On the other hand, if "NO" is determined in the step S17, that is, if the display 14 is not turned OFF, the processor 30 returns to the processing of the step S11.

If "YES" is determined in the step S11, that is, if the lock object RO is dragged, the processor 30 determines in a step S19 whether the lock object RO is overlapped with the notice object O. It is determined whether it is in a state where a part of the lock object RO is overlapped with a part of the mail object Oa (notice object O) as shown in FIG. 6 (D), for example. If "NO" is determined in the step S19, that is, if the lock object RO is not overlapped with the notice object O, the processor 30 proceeds to processing of a step S33 in FIG. 17.

Furthermore, if "YES" is determined in the step S19, that is, if the lock object RO is overlapped with the notice object O, the processor 30 displays a detail pop-up P in a step S21. The detail pop-up P that a part of notice information corresponding to the notice object O is described is displayed as shown in FIG. 6 (D), for example. In addition, the processor 30 that performs the processing of the step S21 functions as a notice information display module.

Subsequently, the processor 30 determines in a step S23 whether the touch is released. That is, it is determined whether the lock object RO is dropped onto the notice object O. In addition, the processor 30 that performs the processing of the step S23 functions as a determining module.

If "YES" is determined in the step S23, that is, if the touch is released in a state where the lock object RO is overlapped with the notice object O, the processor 30 turns OFF the lock flag 344 in a step S25. That is, the lock state is canceled. Subsequently, the processor 30 performs in a step S27 a function corresponding to the notice object O. If the drop operation is performed to the mail object Oa, for example, as shown in FIG. 6 (E), a mail function is performed and a new arrival mail is displayed in the function display area 62. At this time, the notice information corresponding to the mail object Oa is deleted in the notice information table data 336. Then, after the processing of the step S27 is completed, the processor 30 terminates the lock state cancellation processing. In addition, the processor 30 that performs the processing of the step S25 and step S27 functions as a performance module.

Furthermore, if "NO" is determined in the step S23, that is, if the lock object RO is not dropped onto the notice object O, the processor 30 determines in a step S29 whether the notice object O is separated from the lock object RO. That is, it is determined whether it becomes in a state where the lock object RO is not overlapped with the notice object O. If "NO" is determined in the step S29, that is, if a touch position is not changed while the lock object RO is kept to be overlapped with the notice object O, the processor 30 returns to the processing of the step S23.

On the other hand, if "YES" is determined in the step S29, that is, if the lock object RO is separated from the notice object O, the processor 30 non-displays in a step S31 the detail pop-up P. The detail pop-up P that is currently displayed as shown in FIG. 6 (D), for example, is non-displayed. Then, if the processing of the step S31 is completed, the processor 30 proceeds to processing of a step S33 in FIG. 17.

Subsequently, the processor 30 determines in the step S33 whether the lock object RO is overlapped with the camera object CO. That is, it is determined whether it is in a state where a part of the lock object RO is overlapped with a part of the cameral object CO.

Furthermore, if "YES" is determined in the step S33, that is, if the lock object RO is overlapped with the camera object CO, the processor 30 determines in a step S35 whether the touch is released. That is, it is determined whether the lock object RO is dropped onto the camera object CO. If "NO" is determined in the step S35, that is, if the lock object RO is not dropped onto the camera object CO, the processor 30 returns to the processing of the step S33. On the other hand, if "YES" is determined in the step S35, that is, if the drop operation is performed to the camera object CO, the processor 30 turns OFF in a step S37 the lock flag 344, and performs the camera function in a step S39. That is, since the lock state is canceled and the camera function is performed as shown in FIG. 5 (B), a through image is displayed on the display 14. If the processing of the step S39 is completed, the processor 30 terminates the lock state cancellation processing.

If "NO" is determined in the step S33, that is, if the lock object RO is not overlapped with the camera object CO, the processor 30 determines in a step S41 whether the lock object RO is overlapped with the cancellation object DO. That is, it is determined whether it is in a state where a part of the lock object RO is overlapped with a part of the cancellation object DO. If "YES" is determined in the step S41, that is, if the lock object RO is overlapped with the cancellation object DO, the processor 30 determines in a step S43 whether the touch is released. That is, it is determined whether the lock object RO is dropped onto the cancellation object DO. If "NO" is determined in the step S43, that is, if the drop operation is not performed onto the cancellation object DO, the processor 30 returns to the processing of the step S41. On the other hand, if "YES" is determined in the step S43, that is, if the drop operation is performed onto the cancellation object DO, the processor 30 turns OFF the lock flag 344 in a step S45, and displays a standby screen in a step S47. That is, as shown in FIG. 4 (C), the lock state is canceled and the standby screen is displayed on the display 14. Then, if the processing of the step S47 is completed, the processor 30 terminates the lock state cancellation processing.

Furthermore, if "NO" is determined in the step S41, that is, if the lock object RO is not overlapped with the cancellation object DO, the processor 30 determines whether the touch is released in a step S49 in FIG. 18. That is, it is determined whether the lock object RO is released in a state of not overlapping with other objects. If "NO" is determined in the step S49, that is, if the touch is not released, the process returns to the processing of the step S19 in FIG. 16. On the other hand, if "YES" is determined in the step S49, that is, if the lock object RO is released in a state of not overlapping with other objects, the processor 30 displays in a step S51 the lock object RO at its default position, and returns to the processing of the step S11. That is, the processor 30 returns the display position of the lock object RO as shown in FIG. 3.

FIG. 19 is a flowchart of the notice object display processing. If the processing of the step S9 is performed by the lock state cancellation processing, the processor 30 determines in a step S71 whether the notice information of a mail is recorded in the notice information table. For example, the processor 30 determines whether there is any line that "mail" is recorded in the column of a function like the notice information table shown in FIG. 7. If "NO" is determined in the step S71, that is, if the notice information of a mail is not recorded, the processor 30 proceeds to processing of a step S89.

On the other hand, if "YES" is determined in the step S71, the processor 30 determines in a step S73 whether a sender of the new arrival mail is registered in the specific mail address table. That is, it is determined whether the new arrival mail is received from a sender whom mail address is registered in the specific mail address table. If "YES" is determined in the step S73, that is, if the address of the sender of new arrival mail is recorded in the specific mail address table, the processor 30 displays the specific notice object SO in a step S75. As shown in FIG. 9 (B), for example, the specific notice object SO is displayed on the circular arc C. In addition, when "YES" is determined in the step S73, the content of the display position table data 340 is changed such that the specific notice object SO is displayed at the default display position of the cancellation object DO.

Subsequently, the processor 30 determines in a step S77 whether there are two or more new arrival mails. That is, it is determined whether the number of cases is more than "2" in the notice information of the mail. If "NO" is determined in the step S77, that is, if the number of cases is "1", the processor 30 proceeds to processing of a step S87. Furthermore, if "YES" is determined in the step S77, that is, if the number of cases is "3", for example, the processor 30 display the number icon NI in a step S79, and proceeds to the processing of the step S87. For example, the number icon NI shown in FIG. 8 is applied to the specific notice object SO.

Furthermore, if "NO" is determined in the step S73, that is, if the address of the sender of the new arrival mail is not recorded in the specific mail address table, the processor 30 displays the mail object Oa in a step S81. That is, the mail object Oa shown in FIG. 6 (B), etc. is displayed. Subsequently, the processor 30 determines in a step S83 whether there are two or more new arrival mails. That is, it is determined whether the number of cases that receives a new arrival mail is two or more during a time period that the lock state is set. If "NO" is determined in the step S83, that is, if the receiving number of new arrival mails is one (1), for example, the processor 30 proceeds to the processing of the step S87. On the other hand, if "YES" is determined in the step S83, if the receiving number of new arrival mails is three (3), for example, the processor 30 displays in a step S85 the number icon NI, and proceeds to the processing of the step S87. As shown in FIG. 8, for example, the number icon NI is applied to the mail object Oa.

Subsequently, the processor 30 determines in the step S87 whether notice information other than the mail is recorded in the notice information table. It is determined whether notice information such as alarm, etc., for example, is recorded. If "NO" is determined in the step S87, that is, if notice information other than the mail is not recorded, the processor 30 terminates the notice object display processing, and returns to the lock state cancellation processing.

On the other hand, if "YES" is determined in the step S87, that is, if the notice information of the alarm is recorded like the notice information table shown in FIG. 7, for example, the processor 30 displays in a step S89 the notice object O corresponding to a function. If the notice information of the alarm is recorded, for example, as shown in FIG. 8, the alarm object Ob is displayed. Subsequently, the processor 30 determines in a step S91 whether the number of cases is two or more. That is, it is determined whether the number of cases that the notice information of the same kind is recorded is two or more. If "NO" is determined in the step S91, that is, if the number of cases that the notice information of the same kind is one (1), the processor 30 terminates the notice object display processing, and returns to the lock state cancellation processing.

Furthermore, if "YES" is determined in the step S91, that is, if the number of cases that the notice information of the same kind is two or more, the processor 30 displays the number icon NI in a step S93, and terminates the notice object display processing.

In addition, when the notice information of a plurality of functions is recorded, in the processing of the step S89, a plurality of notice objects O corresponding to respective notice information are displayed.

Furthermore, the processor 30 that performs the processing of the steps S79, S85 and S93 functions as a display manner change module.

FIG. 20 is a flowchart of the display position change processing. If the processing of the step S15 is performed by the lock state cancellation processing, the processor 30 determines in a step S111 whether the touch is released. That is, it is determined whether the touch operation to an arbitrary notice objects O is ended. If "NO" is determined in the step S111, that is, if not released, the processor 30 repeats the processing of the step S111. Furthermore, if "YES" is determined in the step S111, that is, if released, the processor 30 determines in a step S113 whether an end position is on the circular arc C. That is, it is determined whether the notice object O is dropped onto the circular arc C. If "NO" is determined in the step S113, that is, if the notice object O is not dropped onto the circular arc C, the processor 30 terminates the display position change processing, and returns to the lock state cancellation processing.

Figure 12:
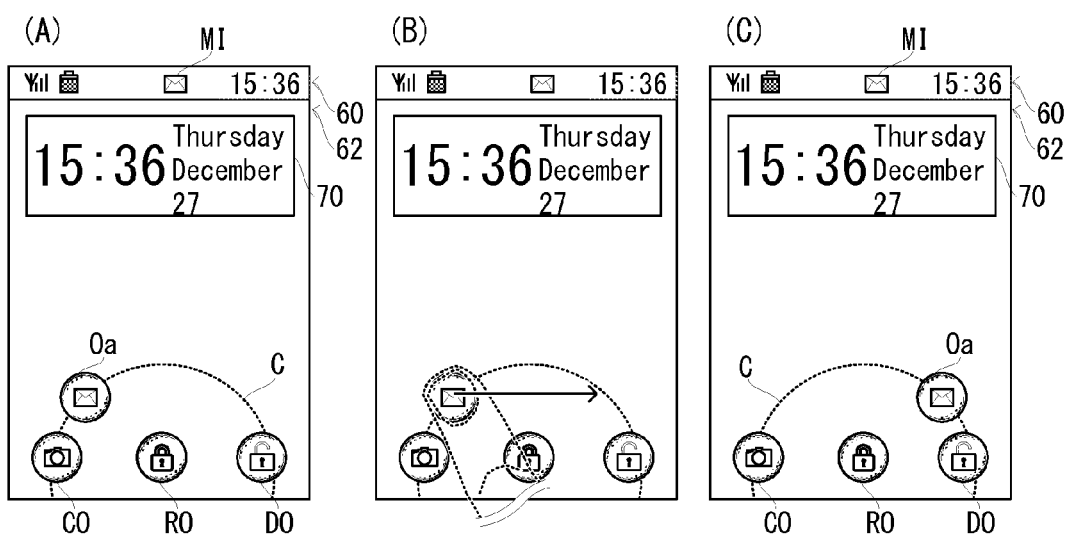

If "YES" is determined in the step S113, that is, if the notice object O is dropped onto the circular arc C, the processor 30 determines in a step S115 whether another object exists at an end position. It is determined whether dropped onto a further notice object O, for example. If "NO" is determined in the step S115, that is, if released on the circular arc C while no other notice object O is displayed as shown in FIG. 12 (B), for example, the processor 30 proceeds to processing of a step S119.

Furthermore, if "YES" is determined in the step S115, that is, if the mail object Oa is dropped onto a position that the cancellation object DO is displayed as shown in FIG. 13 (A), for example, the processor 30 changes in a step S117 a display position of the further object. As shown in FIG. 13 (B), for example, the display position of the cancellation object DO is changed to the upper part. In addition, at this time, the display position of the cancellation object DO is also changed in the display position table.

Subsequently, the processor 30 changes in a step S119 the display position of an object that is dropped. When the mail object Oa is dropped as shown in FIG. 12 (B) or FIG. 13 (A), for example, a position onto which dropped (end position) becomes a display position of the mail object Oa. In addition, at this time, the display position of the mail object Oa is also changed in the display position table. Furthermore, the processor 30 that performs the processing of step the S119 functions as a display position change module.

In addition, in this embodiment, if the lock object RO is overlapped with a part or whole of the cancellation objects DO by the slide operation, the lock state can be canceled. However, if the change of the display position of the lock object RO is stopped when the lock object is overlapped with a part or whole of the cancellation object DO. That is, if the lock object RO is overlapped with a part or whole of the cancellation object DO by the slide operation, the display position of the lock object RO becomes not following a touch position.

Figure 21:
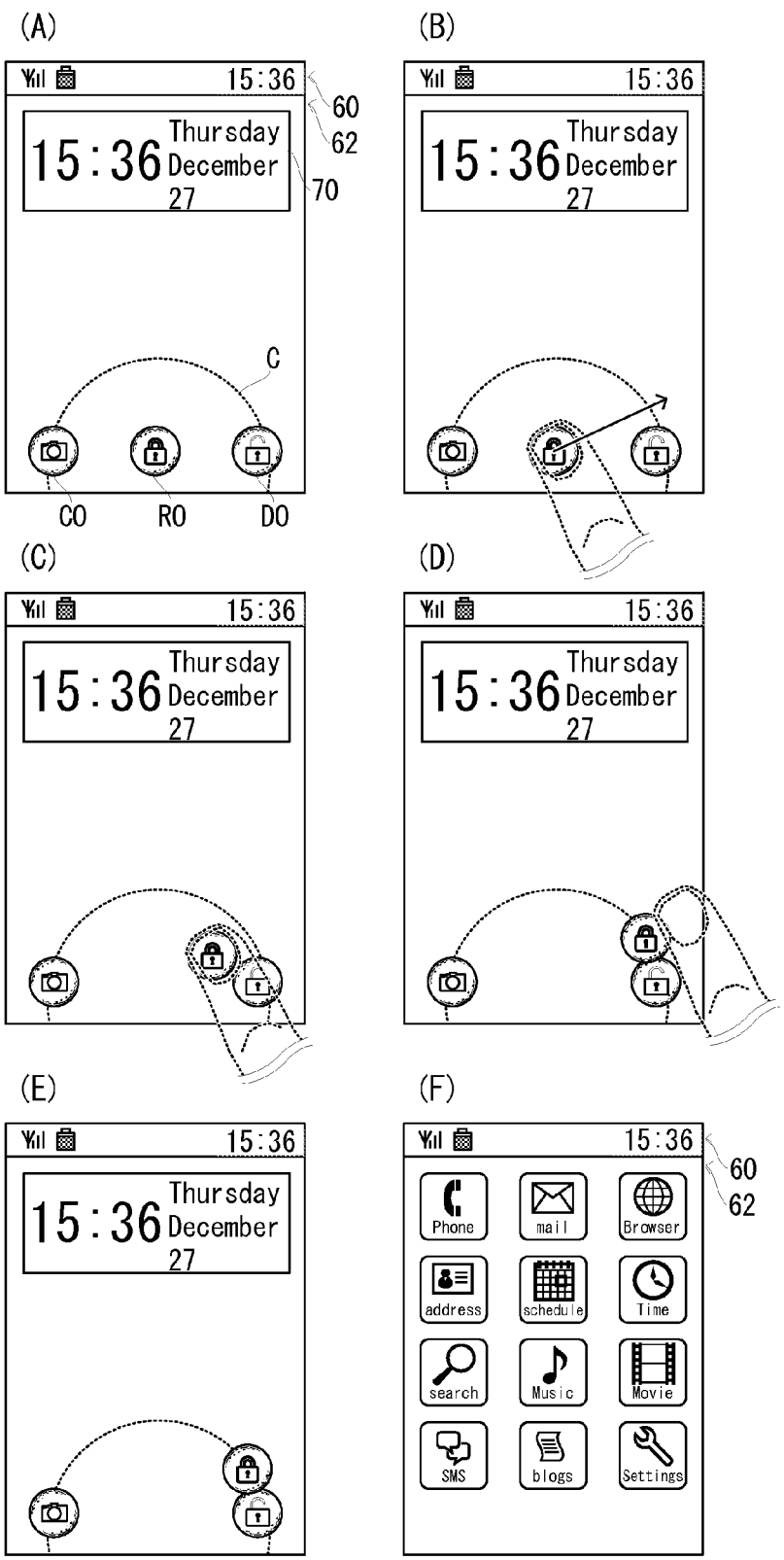
FIG. 21 shows a still further example of an operation when a lock state that is being set in the mobile phone shown in FIG. 1 is to be canceled, wherein FIG. 21 (A) shows a state where a circular arc is further displayed in the lock screen shown in FIG. 3.
Figure 22:
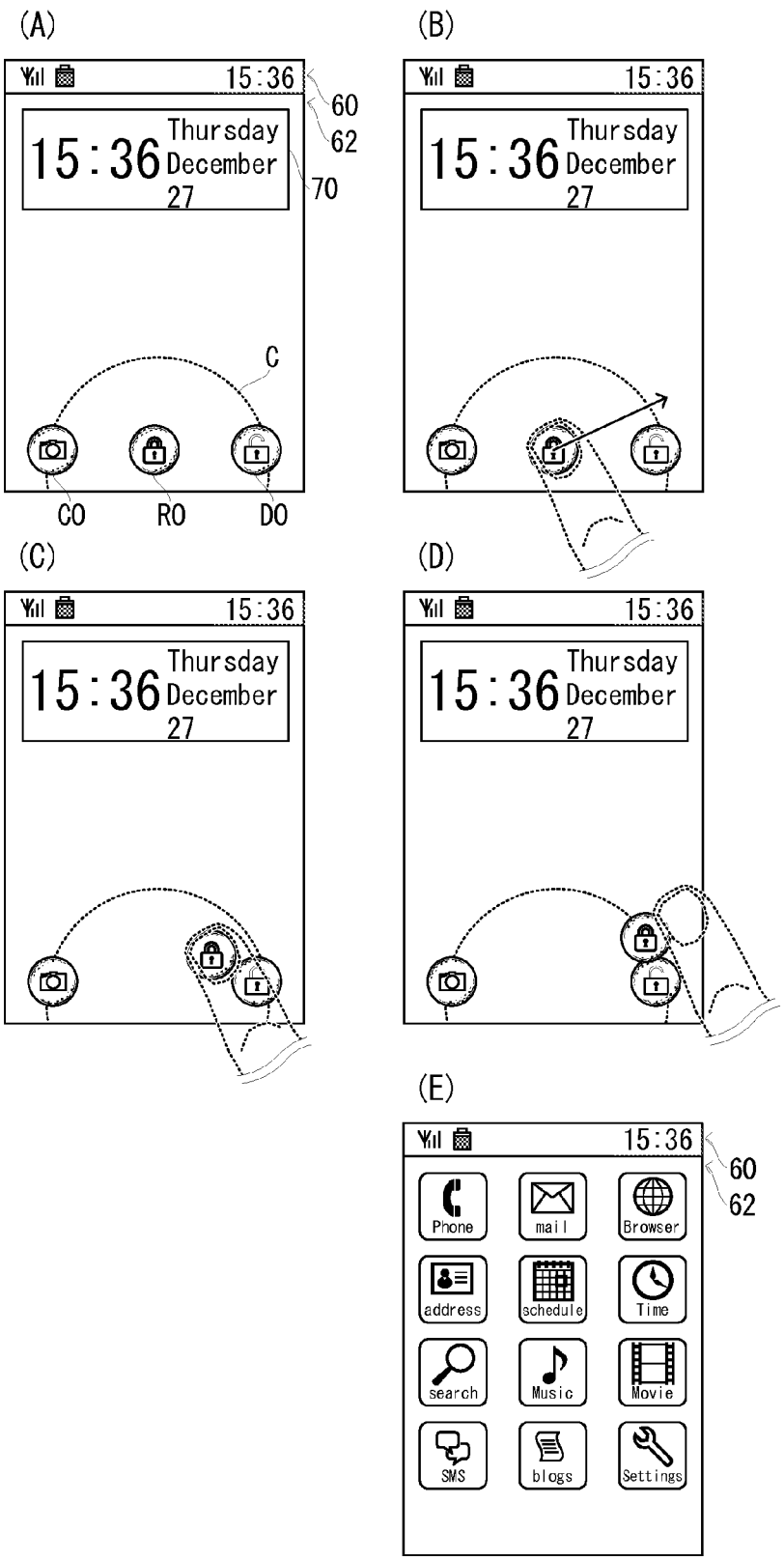
FIG. 22 shows the other example of an operation when a lock state that is being set in the mobile phone shown in FIG. 1 is to be canceled, wherein FIG. 22 (A) shows a state where a circular arc is further displayed in the lock screen shown in FIG. 3.

With reference to FIGS. 21 (A) and 21(B), for example, if the lock object RO is slid after the user touches the lock object RO to display the cancellation object DO, etc., the lock object may be overlapped with the cancellation object DO. At this time, as shown in FIG. 21 (C), the display position of the lock object RO follows to a touch position to be changed. Subsequently, as shown in FIG. 21 (D), if a touch position is crossed over the circular arc C and the lock object RO is overlapped with a part of the cancellation object DO, the cancellation object DO stops on the circular arc C. That is, it becomes in a state where the display position of the lock object RO and the touch position are not in agreement. Then, with reference to FIGS. 21 (E) and 21(F), the lock state is canceled if the user releases. Therefore, it is possible for the user to recognize that a touch operation required for canceling the lock state has already been performed by seeing the object RO stopping on the circular arc C.

In addition, the lock state may be canceled at a time that the touch position exceeds the circular arc C, as shown in FIG. 22(A)-22(E). Specifically, as described above, if the touch position exceeds the circular arc C after the lock object RO is slid and overlapped with a part or whole of the cancellation object DO, the cancellation object DO stops on the circular arc C. However, even if not released here, the lock state is canceled. Thus, the user can cancel the lock state without performing an operation more than required.

Furthermore, in other embodiments, when the lock object RO is flicked and overlapped with a part or whole of the cancellation object DO, the lock state is also canceled. Furthermore, when the lock object RO is not overlapped with another object by the flick operation, the lock state is not canceled but the lock object RO returns to its original place.

Then, the slide operation and the flick operation for canceling the lock state may be performed not only to the cancellation object DO but to the camera object CO, the notice object O, etc., and the lock state can be canceled if these operations are performed.

Furthermore, in other embodiments, if the cancellation operation of the lock state is performed, a security screen asking for an input of a password may be displayed. If the cancellation operation is performed to the lock object RO, for example, a security screen is displayed on the display 14. Then, if a correct password is input on the security screen, the standby screen shown in FIG. 4 (C) becomes to be displayed on the display 14. Re-input of a password is called for when an incorrect password is input at this time.

Furthermore, in other embodiments, it may be set such that when a touch operation is performed to an arbitrary object for a predetermined time period or more, a default display position of the object can be changed.

Furthermore, if a telephone call occurs when a touch operation is being performed to the lock object RO, a telephone call reply screen is displayed while the display of the lock object RO is non-displayed. In this telephone call reply screen, a telephone call reply object for canceling a lock state and for replying the telephone call is included. Then, a telephone conversation is started if the lock object RO is dropped onto the telephone call reply object.

Furthermore, in other embodiments, a function corresponding to an SNS (Social Network Service) such as Facebook (registered trademark), Mixi (registered trademark), etc. may record notice information.

The programs used in the embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case where the programs downloaded via the above-described server or storage medium are installed to a portable terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show one example of a corresponding relationship with the embodiments described above for easy understanding of the present invention, and do not limit the present invention.

An embodiment is a portable terminal having a display portion and a touch panel provided on a surface of the display portion, wherein a lock state restricting performance of predetermined processing with a touch operation can be set, and a lock object for canceling the lock state is displayed on the display portion when the lock state is being set, comprising: a storing module operable to store notice information; a display processing module operable to display a notice object corresponding to the notice information on the display portion when the lock object is displayed; a determining module operable to determine whether a predetermined touch operation that the lock object is moved onto at least a part of a display area of the notice object and then released; and a performance module operable to perform a function corresponding to the notice object while canceling the lock state when it is determined by the determining module that the predetermined touch operation is performed.

In the embodiment, the portable terminal (10: a reference numeral exemplifying a module corresponding in the embodiment, and so forth) is a mobile phone, for example, and comprises the touch panel (16) provided on the surface of the display portion (14). Since a portable terminal performs main operations by the touch panel, in order to prevent an erroneous operation, it is possible to set the lock state of restricting performance of the predetermined processing based on a touch operation. Furthermore, if the display portion is turned ON when the lock state is set, the lock object (RO) for canceling the lock state is displayed on the display portion. The storing module (46) stores notice information when an event of an arbitrary function occurs, for example. The display processing module (30, S9) displays the notice object (Oa, Ob, SO) corresponding to the notice information around the lock object if the lock object that is currently displayed is touched, for example. The determining module (30, S23) determines whether a predetermined touch operation that the lock object is moved onto at least a part of a display area of the notice object and released is performed. If the predetermined touch operation is performed, the performance module (30, S25, S27) cancels the lock state and performs a function (a mail function, an alarm function, etc.) corresponding to the notice object. At this time, on the display portion, the lock object and the notice object are non-displayed, and a GUI, etc. of the function that is performed is displayed.

According to the embodiment, it is possible to make a function that is more likely performed by a user easy to be performed with cancellation of the lock state by displaying a notice object. Accordingly, it is possible to increase convenience of a portable terminal that a lock state is being set.

Another embodiment further comprises a notice information display module operable to display at least a part of the notice information when the lock object is moved onto at least a part of the display areas of the notice object.

In this embodiment, the notice information display module (30, S21) displays a part of the notice information (the sender of mail, the content of alarm, etc., for example) using a pop-up (P), etc. if the lock object is overlapped with at least a part of the notice object, for example.

According to this embodiment, it becomes possible for a user to determine whether the function corresponding to the notice object is to be performed.

A further embodiment further comprises a display manner change module operable to change a display manner of the notice object corresponding to the notice information when two or more notice information of the same kind are recorded.

In the further embodiment, if two or more notice information of the same kind are recorded, for example, the display manner change module (30, S79, S85, S93) applies an icon (NI) indicating the number of cases being recorded to the notice object to change the display manner of the notice object.

According to the further embodiment, the user can grasp more correctly the notice information currently recorded.

A still further embodiment further comprises a display position change module operable to change a display position of the notice object when a change operation of the display position of the notice object is performed.

In the still further embodiment, if an operation that the notice object is slid while being kept to be touched and released at an arbitrary position is performed when the notice object is displayed, for example, the display position change module (30, S119) changes the display position that the notice object is displayed as default to a released position.

According to the still further embodiment, the user can change the position that the notice object was displayed to a position that himself/herself can easily operate.

In a yet further embodiment, the notice object is displayed in a display manner that differs for each function corresponding to the notice information.

In the yet further embodiment, the notice object (Oa) corresponding to the notice information of a mail function and the notice object (Ob) corresponding to the notice information of an alarm function, for example, are displayed in different display manners.

According to the yet further embodiment, the user can grasp the notice information intuitively by changing the display manner of the notice object according to the function corresponding to the notice information.

In a yet still further embodiment, the notice information includes information of a receiving mail, and if it is determined by the determining module that the predetermined touch operation is performed to the notice object corresponding to the information of the receiving mail, the performance module performs the mail function while canceling the lock state.

In the yet still further embodiment, the notice information includes the information of the receiving mail (a sender, a title, etc.). If the predetermined touch operation is performed, the performance module performs the mail function while canceling the lock state.

In a further embodiment, a record module records the notice information when a mail is received, and the information concerning the receiving mail is displayed on the display portion when the mail function is performed by the performance module.

In the further embodiment, the record module records the notice information including the information of the receiving mail when the mail is received. Furthermore, if the mail function is performed by the predetermined touch operation, the information concerning the receiving mail is displayed on the display portion.

In a still further embodiment, the information concerning the receiving mail includes a text of the receiving mail.

According to the yet still further embodiment, the further embodiment and the still further embodiment, the user can, with few operating procedures, check unread receiving mail while canceling the lock state.

In a yet further embodiment, the information concerning the receiving mail includes a list of receiving mails.

According to the yet further embodiment, the user can check other receiving mail as well as the receiving mail that is unread.

In a still further embodiment, the display processing module displays a specific notice object on the display portion in a different display manner from those of the notice object notifying the receiving mail from a usual sender when a sender of the receiving mail is a predetermined specific sender.

In the still further embodiment, if the mail is received from the specific sender in the lock state, the specific notice object (SO) is displayed.

In a yet still further embodiment, the display processing module displays the specific notice object at a position that is different from those of the notice object notifying the receiving mail from the usual sender.

According to the still further embodiment and the yet still further embodiment, even if the user does not cancel the lock state, the user can notice that there is a new arrival mail from the specific sender.

In a further embodiment, the notice information includes notifying information of an alarm.

According to the further embodiment, the user can grasp the content of the alarm that is notified.

The other embodiment is a lock state cancellation method in a portable terminal (10) having a display portion (14), a touch panel (16) provided on a surface of the display portion and a storing module (46) operable to store notice information, wherein a lock state restricting performance of predetermined processing with a touch operation can be set, and a lock object (RO) for canceling the lock state is displayed on the display portion when the lock state is being set, a processor of the portable terminal performing steps of: a display processing step (S9) displaying a notice object (Oa, Ob, SO) corresponding to the notice information on the display portion when the lock object is displayed; a determining step (S23) determining whether a predetermined touch operation that the lock object is moved onto at least a part of a display area of the notice object and then released; and a performance step (S25, S27) performing a function corresponding to the notice object while canceling the lock state when it is determined in the determining step that the predetermined touch operation is performed.

According to the other embodiment, it is possible to make a function that is more likely performed by a user easy to be performed with cancellation of the lock state by displaying a notice object. Accordingly, the convenience of the portable terminal that the lock state is set improves.

Although the present invention has been described and illustrated in detail, it is clearly understood that the same is by way of illustration and example only and is not to be taken by way of limitation, the spirit and scope of the present invention being limited only by the terms of the appended claim.

DESCRIPTION OF NUMERALS

10—portable phone
14—display
16—touch panel
30—processor

40—input device
44—flash memory
46—RAM

The invention claimed is:

1. A portable terminal comprising:
a touch panel display; and
at least one processor coupled with the touch panel display that, during a locked state in which performance of at least one function in response to a touch operation on the touch panel display is restricted,
displays a first object on the touch panel display,
detects the touch operation on the first object,
after detecting the touch operation on the first object, displays a part of information related to a received email on the touch panel display, and,
when the touch operation comprises a touch to the first object, followed by a movement in a direction towards a second object that is associated with the part of information related to the received email, followed by a release of the touch operation,
cancels the locked state, and
displays the received email on the touch panel display.

2. The portable terminal according to claim 1, wherein the at least one processor displays the part of information related to the received email before the release of the touch operation.

3. The portable terminal according to claim 1, wherein the part of information related to the received email comprises sender information for the received email.

4. The portable terminal according to claim 1, wherein the part of information related to the received email comprises a title of the received email.

5. The portable terminal according to claim 1, wherein the part of information related to the received email comprises a number of received emails.

6. The portable terminal according to claim 1, wherein the release of the touch operation occurs at a position that overlaps with the second object.

7. A method in a portable terminal comprising a touch panel display and at least one processor, wherein the method comprises the at least one processor, during a locked state in which performance of at least one function in response to a touch operation on the touch panel display is restricted:
displaying a first object on the touch panel display;
detecting the touch operation on the first object;
after detecting the touch operation on the first object, displaying a part of information related to a received email on the touch panel display; and,
when the touch operation comprises a touch to the first object, followed by a movement in a direction towards a second object that is associated with the part of information related to the received email, followed by a release of the touch operation,
canceling the locked state, and
displaying the received email on the touch panel display.

8. A non-transitory computer-readable medium having instructions stored thereon, wherein the instructions, when executed by a processor, cause the processor to, during a locked state in which performance of at least one function in response to a touch operation on a touch panel display is restricted:
display a first object on the touch panel display;
detect the touch operation on the first object;
after detecting the touch operation on the first object, display a part of information related to a received email on the touch panel display; and,
when the touch operation comprises a touch to the first object, followed by a movement in a direction towards a second object that is associated with the part of information related to the received email, followed by a release of the touch operation,
cancel the locked state, and
display the received email on the touch panel display.

* * * * *